(12) United States Patent
Minakuchi et al.

(10) Patent No.: US 10,518,484 B2
(45) Date of Patent: Dec. 31, 2019

(54) BONDED STRUCTURE

(71) Applicant: The University of Tokyo, Tokyo (JP)

(72) Inventors: Shu Minakuchi, Tokyo (JP); Nobuo Takeda, Tokyo (JP)

(73) Assignee: The University of Tokyo, Tokyo (JP)

( * ) Notice: Subject to any disclaimer, the term of this patent is extended or adjusted under 35 U.S.C. 154(b) by 115 days.

(21) Appl. No.: 15/550,585

(22) PCT Filed: Feb. 9, 2016

(86) PCT No.: PCT/JP2016/053723
§ 371 (c)(1),
(2) Date: Aug. 11, 2017

(87) PCT Pub. No.: WO2016/129570
PCT Pub. Date: Aug. 18, 2016

(65) Prior Publication Data
US 2018/0036962 A1 Feb. 8, 2018

(30) Foreign Application Priority Data
Feb. 13, 2015 (JP) .................................. 2015-026278

(51) Int. Cl.
*B29C 65/00* (2006.01)
*B32B 3/06* (2006.01)
(Continued)

(52) U.S. Cl.
CPC .......... *B29C 66/712* (2013.01); *B29C 66/139* (2013.01); *B29C 70/30* (2013.01);
(Continued)

(58) Field of Classification Search
CPC .............. B29C 66/712; B29C 66/139; B29C 66/02245; B29C 66/1122; B29C 66/45; B29C 66/496; B29C 66/7212; B29C 66/73756; B29C 70/30; B29C 65/48; B29C 65/4835; B29C 65/5014; B29C 65/5057;
(Continued)

(56) References Cited

U.S. PATENT DOCUMENTS

2005/0074593 A1* 4/2005 Day ........................ B32B 5/22
428/292.1
2009/0022935 A1 1/2009 Hirose et al.
(Continued)

FOREIGN PATENT DOCUMENTS

JP H06-158739 A 6/1994
JP 2006-282046 A 10/2006
(Continued)

*Primary Examiner* — Megha M Gaitonde
(74) *Attorney, Agent, or Firm* — Wolf, Greenfield & Sacks, P.C.

(57) ABSTRACT

A bonded structure includes a first fiber part (12) and a second fiber part (14) arranged between a first member (10) and a second member (20). The first fiber part (12) and the second fiber part (14) are bonded so as to connect the first member (10) and the second member (20) to each other. The first fiber part (12) and the second fiber part (14) are arranged so that the fibers constituting the first fiber part (12) and the second fiber part (14) are oriented in a direction from the first member (10) toward the second member (20).

5 Claims, 17 Drawing Sheets

(51) Int. Cl.
*F16B 5/00* (2006.01)
*F16B 11/00* (2006.01)
*B29C 70/30* (2006.01)
*B29C 65/48* (2006.01)
*B32B 5/12* (2006.01)
*B29C 65/50* (2006.01)
*B29C 65/82* (2006.01)

(52) U.S. Cl.
CPC .............. *B32B 3/06* (2013.01); *F16B 5/0004* (2013.01); *F16B 11/006* (2013.01); *B29C 65/48* (2013.01); *B29C 65/4835* (2013.01); *B29C 65/5014* (2013.01); *B29C 65/5057* (2013.01); *B29C 65/5078* (2013.01); *B29C 65/8207* (2013.01); *B29C 65/8253* (2013.01); *B29C 66/02245* (2013.01); *B29C 66/1122* (2013.01); *B29C 66/45* (2013.01); *B29C 66/496* (2013.01); *B29C 66/7212* (2013.01); *B29C 66/73756* (2013.01); *B32B 5/12* (2013.01); *B32B 2260/023* (2013.01)

(58) Field of Classification Search
CPC ... B29C 65/5064; B29C 65/5078; B32B 3/06; B32B 3/08; B32B 3/085; B32B 3/26; B32B 3/30; B32B 5/12; B32B 5/22; B32B 5/28; B32B 2260/023; F16B 5/0004; F16B 5/002; F16B 11/006; Y10T 428/24058; Y10T 428/24074; Y10T 428/24083; Y10T 428/24124; Y10T 428/24132; Y10T 428/24479; Y10T 428/24496; Y10T 428/24504; Y10T 428/24521; Y10T 428/24529; Y10T 428/24537; Y10T 428/2457; Y10T 428/24612; Y10T 428/24628; Y10T 428/24636; Y10T 428/24669; E04C 2/36
USPC ....... 428/105, 107, 108, 113, 174, 175, 179; 156/275.7, 65
See application file for complete search history.

(56) References Cited

U.S. PATENT DOCUMENTS

| | | |
|---|---|---|
| 2011/0179731 A1 | 7/2011 | Kuroiwa |
| 2012/0045606 A1 | 2/2012 | Griess et al. |
| 2013/0075526 A1 | 3/2013 | Griess et al. |

FOREIGN PATENT DOCUMENTS

| | | |
|---|---|---|
| JP | 2009-083551 A | 4/2009 |
| JP | 2010-032030 A | 2/2010 |
| JP | 4928403 B2 | 5/2012 |
| JP | 5219223 B2 | 6/2013 |

\* cited by examiner

BONDED STRUCTURE

CROSS REFERENCE TO RELATED APPLICATIONS

This application is a national stage filing under 35 U.S.C. § 371 of International Application No. PCT/JP2016/053723 filed Feb. 9, 2016, which claims priority to JP2015/026278 filed Feb. 13, 2015, the entire content of both are incorporated by reference herein.

TECHNICAL FIELD

This invention relates to a bonded structure in which a first member and a second member are bonded together in an opposing state.

BACKGROUND ART

Various structures including a structure in Patent Document 1 are proposed for a bonded structure in which two members, specifically, two plate-like members are bonded together by an adhesive. In the bonded structure described in Patent Document 1, one or more holes are provided in a surface of at least one plate-like member in contact with an adhesive out of two plate-like members so that the adhesive flows out from the hole to an upper surface.

CITATION LIST

Patent Document

Patent Document 1: Japanese Patent Application Publication No. 2010-32030

SUMMARY

Technical Problem

A structure in which a pair of members are bonded together is desired to be applied to various parts, and hence a structure capable of responding to various load applications through simple means is desired. More specifically, a structure preventing a crack from growing when a load is applied is desired. However, a bonded structure that can satisfy requirements in every way has not been proposed. For example, as in Patent Document 1, some bonded structures need a special process or can only respond to a certain aspect of load application.

This invention is provided in view of the above-mentioned problem, and has an object to provide a bonded structure capable of preventing a crack from growing when various loads are applied through simple means.

Solution to Problem

In order to solve the above-mentioned problem, a bonded structure according to this invention in which a first member and a second member are bonded together in an opposing state includes: a crack growth prevention part arranged between the first member and the second member, in which the first member has a first bonding surface and the second member has a second bonding surface, and the crack growth prevention part is provided so as to connect the first bonding surface and the second bonding surface to each other.

According to this invention, the crack growth prevention part is provided to connect the first bonding surface and the second bonding surface to each other directly or indirectly via other members. As a result, for example, even if a crack is formed in a bonding part between the first bonding surface and the second bonding surface, the crack growth prevention part can prevent the crack from growing, thereby increasing the bonding strength. In this way, the growth of cracks due to various loads can be prevented through simple means of providing the crack growth prevention part between the first member and the second member to be bonded. The crack growth prevention part may be provided to be directly connected to the first bonding surface and the second bonding surface, or provided to be connected thereto via an adhesive layer. The term "bond" is herein a concept including an aspect of connecting via other members (a fiber or a resin) and an aspect of connecting by being integrally formed with a member to be bonded.

In the bonded structure according to this invention, it is also preferred that the crack growth prevention part includes fibers and be arranged so that the fibers are oriented in a direction from the first bonding surface toward the second bonding surface.

In this preferred aspect, the fibers included in the crack growth prevention part are arranged to be oriented in a direction from the first bonding surface toward the second bonding surface, and hence the growth of cracks due to various loads can be prevented through simple means of modifying the fiber orientation direction of the crack growth prevention part.

In the bonded structure according to this invention, it is also preferred that the crack growth prevention part includes a first fiber part and a second fiber part, the first bonding surface and the second bonding surface each include a first region, a second region, and a third region provided between the first region and the second region, the first fiber part be provided so as to connect the first region of the first bonding surface and the second region of the second bonding surface to each other, the second fiber part be provided so as to connect the second region of the first bonding surface and the first region of the second bonding surface to each other, and the first fiber part and the second fiber part be arranged to cross each other when the third region is seen from between the first member and the second member.

In this preferred aspect, the first fiber part and the second fiber part are arranged to cross each other as the crack growth prevention part, and hence the crack can be prevented from growing, thereby increasing the bonding strength.

In the bonded structure according to this invention, it is also preferred that a recessed part be formed in a part in the first region of the first bonding surface to which the first fiber part is bonded, and a recessed part be formed in a part in the first region of the second bonding surface to which the second fiber part is bonded.

In this invention, leading the crack to a place between the first fiber part and the second fiber part enhances the reinforcement effect of the first fiber part and the second fiber part. By forming the recessed parts as described above and arranging the first fiber part and the second fiber part therein, the crack can be prevented from entering between the first fiber part and the first bonding surface and between the second fiber part and the second bonding surface, and the crack can be reliably led to a place between the first fiber part and the second fiber part.

In the bonded structure according to this invention, it is also preferred that the bonding structure further include a reinforcement part and a bonding part arranged between the first member and the second member, the first fiber part and the second fiber part each include a continuous region and a strip-shaped region, the continuous region of the first fiber part be bonded to the first region of the first bonding surface, the continuous region of the second fiber part be bonded to the first region of the second bonding surface, the bonding part be arranged between the continuous region of the first fiber part and the continuous region of the second fiber part, the strip-shaped region of the first fiber part and the strip-shaped region of the second fiber part be directly bonded together, slits be formed so that a plurality of strip-shaped regions are formed along a fiber orientation direction, the plurality of strip-shaped regions be alternately bonded to the second region of the first bonding surface and the second region of the second bonding surface, and the reinforcement part be arranged between the bonded strip-shaped regions.

In this preferred aspect, the plurality of strip-shaped regions are alternately bonded to the second region of the first bonding surface and the second region of the second bonding surface, and hence the first fiber part and the second fiber part can reliably cross each other. The reinforcement part is arranged between the first fiber part and the second fiber part. Hence, when the crack grows from the bonding part side, the first fiber part can be prevented from moving to the first member side and the second fiber part can be prevented from moving to the second member side as if there is a bearer bar. As a result, even if a load is applied on the first fiber part and the second fiber part, a distance between the first fiber part and the second fiber part can be maintained and the strength can be further increased.

In the bonded structure according to this invention, it is also preferred that the reinforcement part include a third fiber part, and fiber orientation directions of the first fiber part and the second fiber part cross a fiber orientation direction of the third fiber part.

In this preferred aspect, the strength of the reinforcement part can be ensured through simple means of arranging the fiber orientation directions of the first fiber part and the second fiber part and the fiber orientation direction of the third fiber part to cross each other.

Advantageous Effects of Invention

According to this invention, the bonded structure capable of preventing the growth of cracks due to various loads through simple means can be provided.

DESCRIPTION OF EMBODIMENTS

Figure 1:
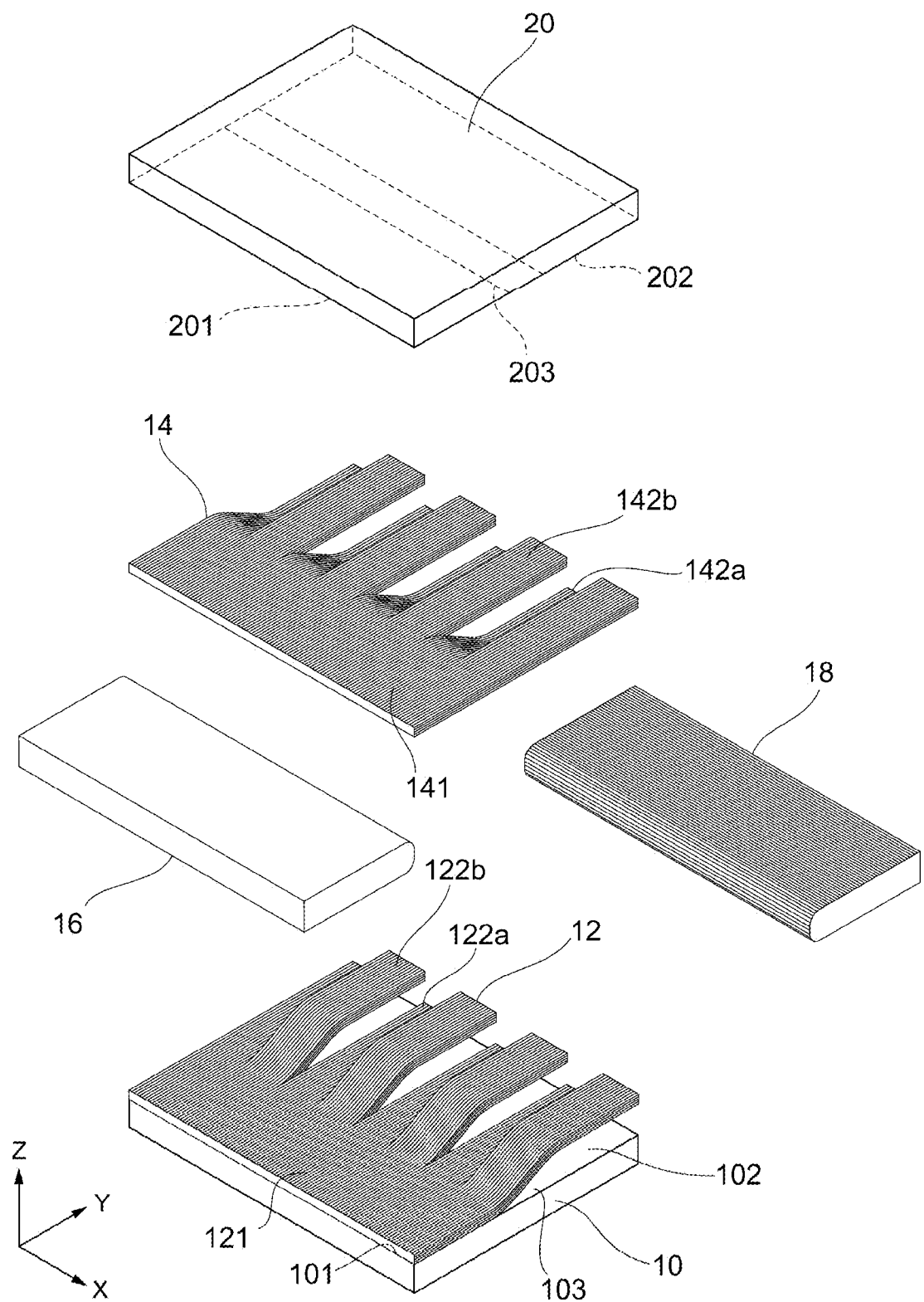
FIG. 1 is an exploded perspective view for describing a bonded structure that is an embodiment of this invention.

An embodiment of this invention is described below with reference to the attached drawings. In order to facilitate the understanding of the description, the same components are denoted by the same numerals as much as possible in the drawings, and overlapping descriptions are omitted.

Figure 2:
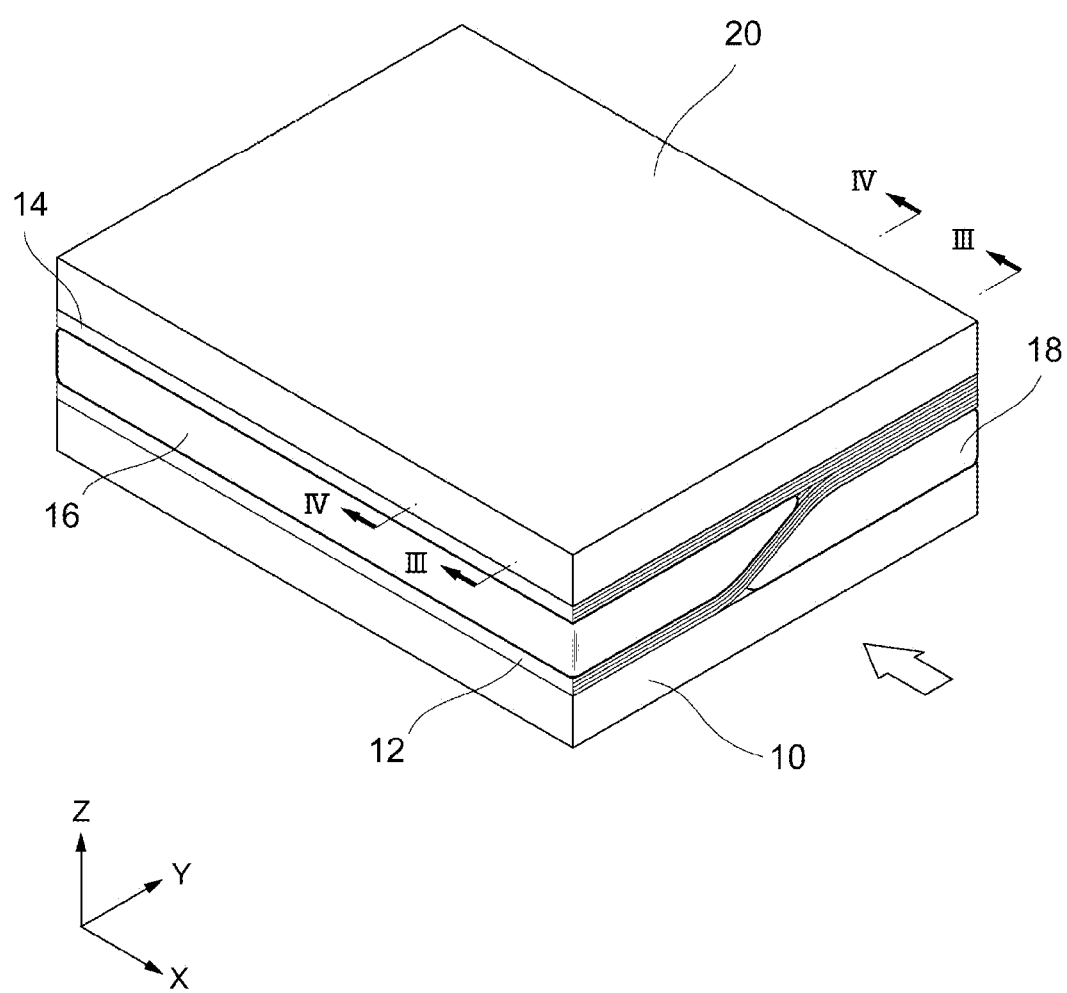
FIG. 2 is a perspective view illustrating the bonded structure that is the embodiment of this invention.

A bonded structure that is the embodiment of this invention is described with reference to FIG. 1 and FIG. 2. FIG. 1 is an exploded perspective view for describing the bonded structure that is the embodiment of this invention. FIG. 2 is a perspective view illustrating the bonded structure that is the embodiment of this invention.

The bonded structure of this embodiment is a structure in which a first member 10 and a second member 20 are bonded together. The form and material of the first member 10 and the second member 20 are not particularly limited, but it is preferred that composite materials such as CFRP be used.

A first fiber part 12, a second fiber part 14, a bonding part 16, and a reinforcement part 18 are arranged between the first member 10 and the second member 20. The first fiber part 12 and the second fiber part 14 form a crack growth prevention part of this invention. The embodiment of the crack growth prevention part is not limited to this embodiment and a metallic plate can be used, for example.

The first fiber part 12 has a continuous region 121 and strip-shaped regions 122a and 122b formed therein. The second fiber part 14 has a continuous region 141 and strip-shaped regions 142a and 142b formed therein.

The first fiber part 12 and the second fiber part 14 are bonded together through pressurization with the bonding part 16 placed therebetween. After the bonding, slits are formed, to thereby form the strip-shaped regions 122a and 122b and the strip-shaped regions 142a and 142b. As a result, the strip-shaped region 122a and the strip-shaped region 142a are bonded together and the strip-shaped region 122b and the strip-shaped region 142b are bonded together.

The strip-shaped regions 122a and 142a and the strip-shaped regions 122b and 142b are placed so as to alternate with each other, and the reinforcement part 18 is inserted therebetween. The fibers in the first fiber part 12 and the second fiber part 14 are oriented in a Y axis direction and the fibers in the reinforcement part 18 are oriented in an X axis direction. As a result, the fiber orientation direction of the first fiber part 12 and the second fiber part 14 and the fiber orientation direction of the reinforcement part 18 are arranged to cross each other.

The first fiber part 12, the second fiber part 14, the bonding part 16, and the reinforcement part 18 are sandwiched between the first member 10 and the second member 20. Then, the first member 10 and the second member 20 are bonded together through pressurizing and compressing. Although not shown, an adhesive is applied on parts that are needed to be bonded together such as between the first member 10 and the first fiber part 12 and between the second member 20 and the second fiber part 14.

Figure 3:
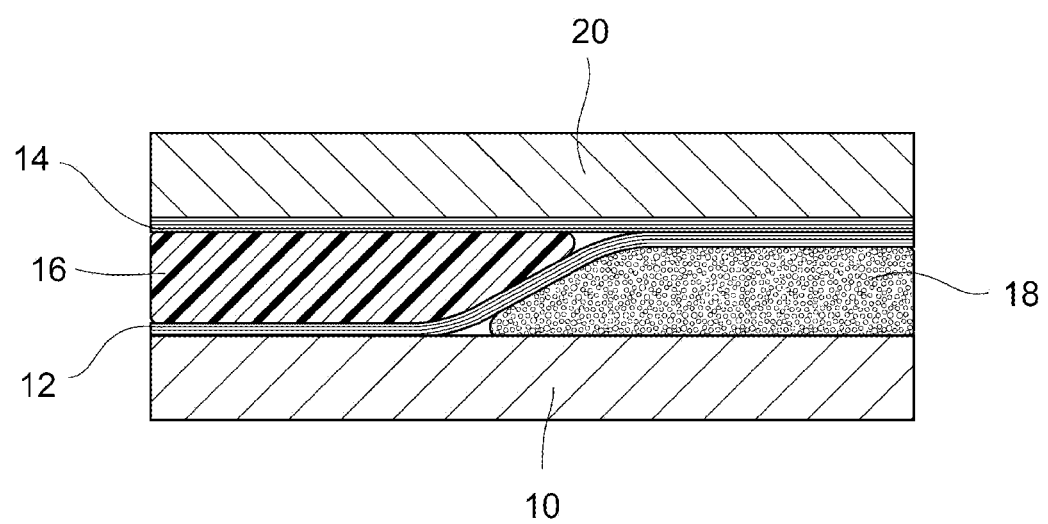
FIG. 3 is a cross-sectional view taken along the line III-III in FIG. 2.
Figure 4:
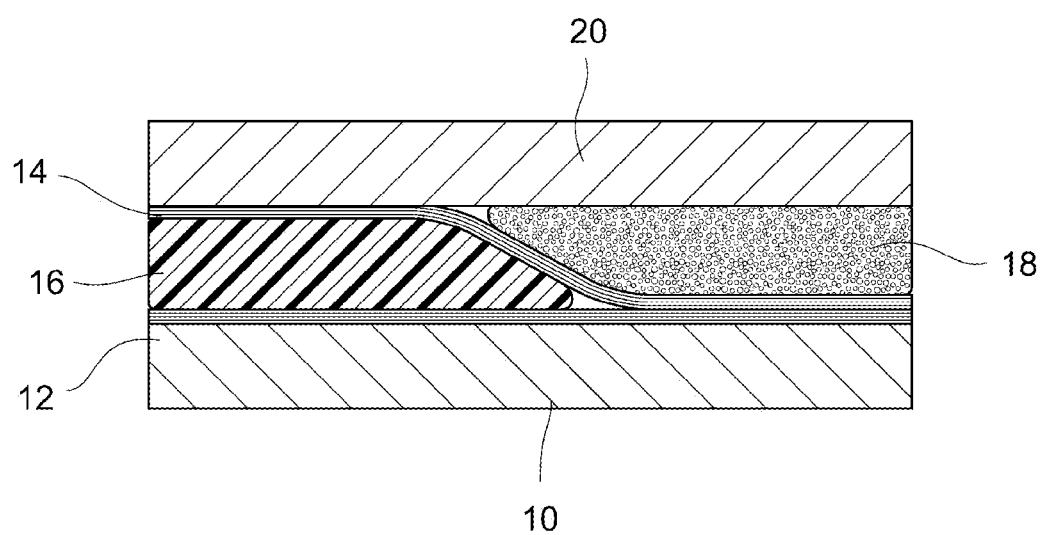
FIG. 4 is a cross-sectional view taken along the line IV-IV in FIG. 2.
Figure 5:
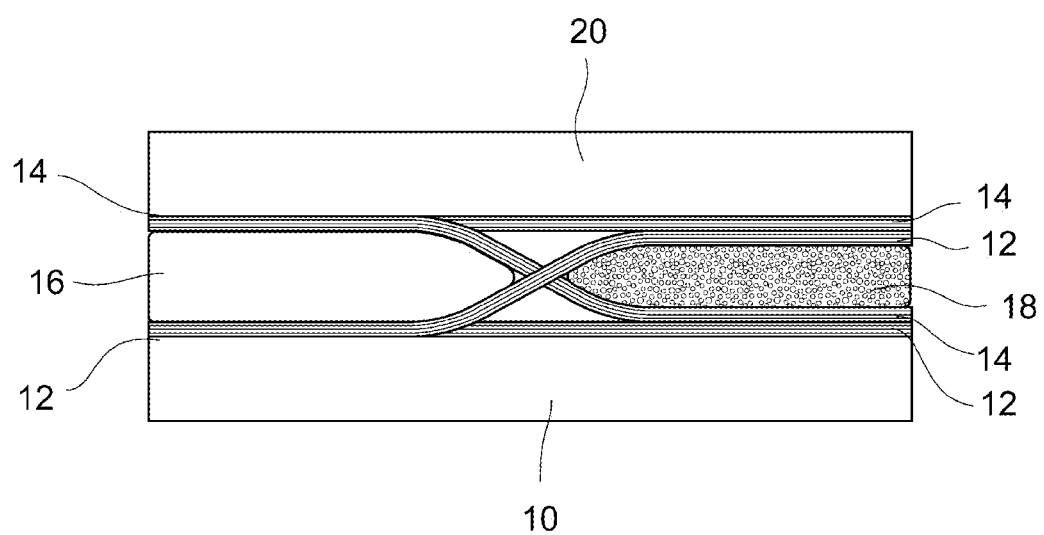
FIG. 5 is a side view of the bonded structure in FIG. 2.

FIG. 3 is a cross-sectional view taken along the line III-III in FIG. 2, and FIG. 4 is a cross-sectional view taken along the line IV-IV in FIG. 2. A structure of the cross section as illustrated in FIG. 3 and a structure of the cross section as illustrated in FIG. 4 alternately appear in the bonded structure of this embodiment. As illustrated in FIG. 5, the bonded structure has an X structure in which the first fiber part 12 and the second fiber part 14 cross each other when seen from the direction of the arrows in FIG. 2.

Figure 6:
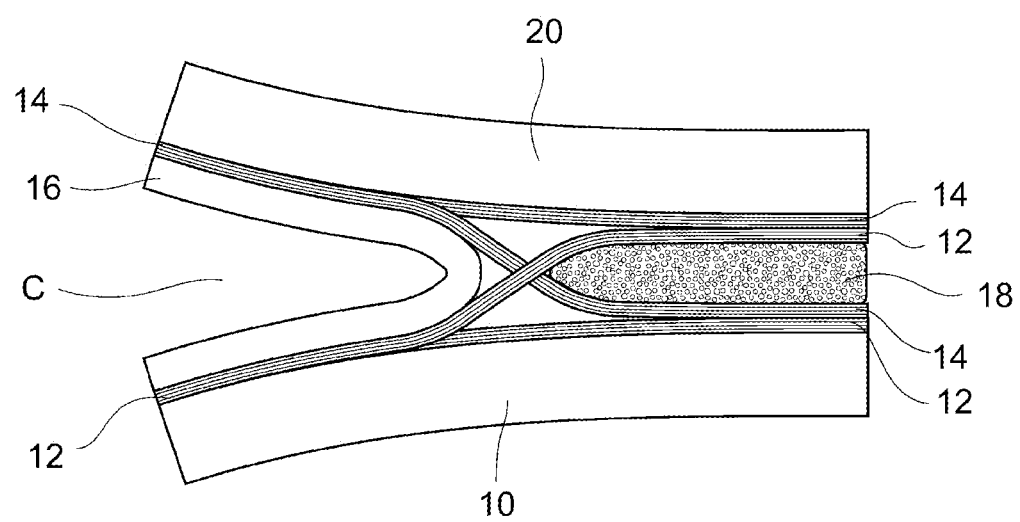
FIG. 6 is a view illustrating a state in which a crack is formed from the state in FIG. 5.
Figure 7:
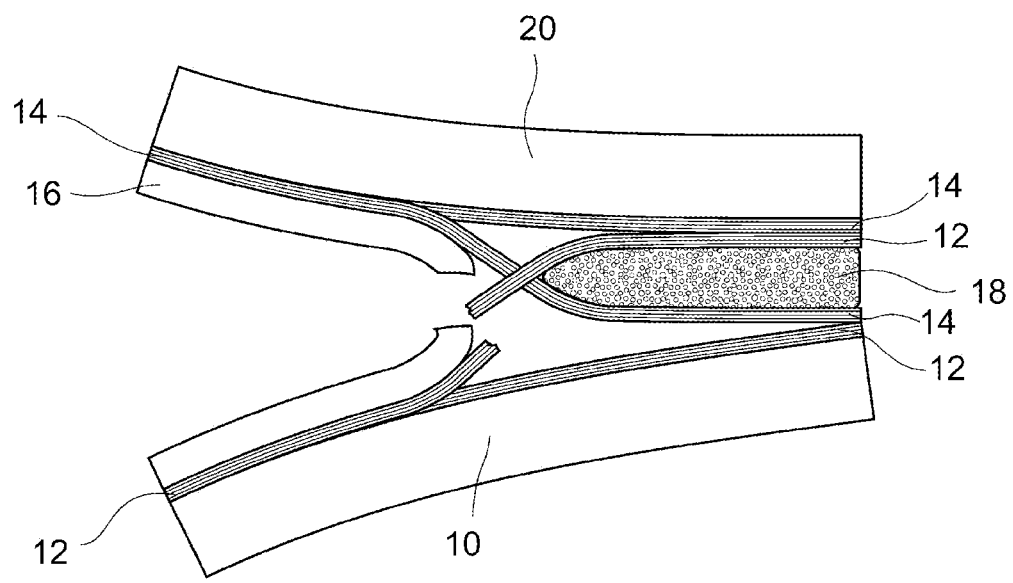
FIG. 7 is a view illustrating a state in which the crack has further grown from the state in FIG. 6.

A crack C is formed when a force is applied so as to separate the first member 10 and the second member 20 from each other from the state in FIG. 5. The crack C grows in the bonding part 16, and reaches an X structure part in which the first fiber part 12 and the second fiber part 14 cross each other. When the crack C reaches this part, the first fiber part 12 and the second fiber part 14 function to connect the first member 10 and the second member 20 to each other so that the crack C does not grow any further. When the force is continued to be further applied, the crack reaches a breaking point of the first fiber part 12 and the second fiber part 14, to thereby cause a state as illustrated in FIG. 7. The situation of the growth of the crack C from FIG. 5 to FIG. 7 is only an example. For example, when the strength of the fibers forming the reinforcement part 18 are weaker than the fibers forming the first fiber part 12, the reinforcement part 18 is strangled between the first fiber part 12 and the second fiber part 14, which causes the fibers forming the reinforcement part 18 to be gradually cut. In any case, the growth of the crack C is controlled by the resistance or strength in the direction that the fibers forming the first fiber part 12 and the second fiber part 14 extend (the resistance or strength of the fibers when a tensile force is applied on the fibers) and the resistance or strength in the direction of the cross section of the fibers forming the reinforcement part 18 (the resistance or strength of the fibers when a shear force is applied on the fibers) against the force propagated in accordance with the growth of the crack C.

As described above, this embodiment is a bonded structure in which the first member 10 and the second member 20 are bonded together in an opposing state, and includes the first fiber part 12 and the second fiber part 14 arranged between the first member 10 and the second member 20. The first member 10 includes a first region 101, a second region 102, and a third region 103 serving as a first bonding surface. The second member 20 includes a first region 201, a second region 202, and a third region 203 serving as a second bonding surface. The first fiber part 12 and the second fiber part 14 are bonded together, to thereby connect the first bonding surface (the first region 101, the second region 102, and the third region 103) and the second bonding surface (the first region 201, the second region 202, the third region 203) to each other. The fibers forming the first fiber part 12 and the second fiber part 14 are arranged to be oriented in a direction from the first bonding surface toward the second bonding surface.

In this embodiment, the third region 103 is arranged between the first region 101 and the second region 102 in the first member 10, and the third region 203 is arranged between the first region 201 and the second region 202 in the second member 20. The first fiber part 12 is bonded so as to connect the first region 101 serving as the first bonding surface and the second region 202 serving as the second bonding surface to each other, and the second fiber part 14 is bonded so as to connect the second region 102 serving as the first bonding surface and the first region 201 serving as the second bonding surface to each other. As illustrated in FIG. 5, when the third regions 103 and 203 are seen from between the first member 10 and the second member 20, the first fiber part 12 and the second fiber part 14 are arranged so as to cross each other.

In this embodiment, the first fiber part 12 includes the continuous region 121 and the strip-shaped regions 122a and 122b. The second fiber part 14 includes the continuous region 141 and the strip-shaped regions 142a and 142b. The continuous region 121 of the first fiber part 12 is bonded to the first region 101 of the first member 10, and the continuous region 141 of the second fiber part 14 is bonded to the first region 201 of the second member 20. The bonding part 16 is arranged between the continuous region 121 of the first fiber part 12 and the continuous region 141 of the second fiber part 14. The strip-shaped regions 122a and 122b of the first fiber part 12 and the strip-shaped regions 142a and 142b of the second fiber part 14 are directly bonded together, and slits are formed along the fiber orientation direction so as to form a plurality of strip-shaped regions. The plurality of strip-shaped regions 122a, 122b, 142a, and 142b are alternately bonded to the second region 102 of the first member 10 and the second region 202 of the second member 20, and the reinforcement part 18 is arranged therebetween.

Figure 8:
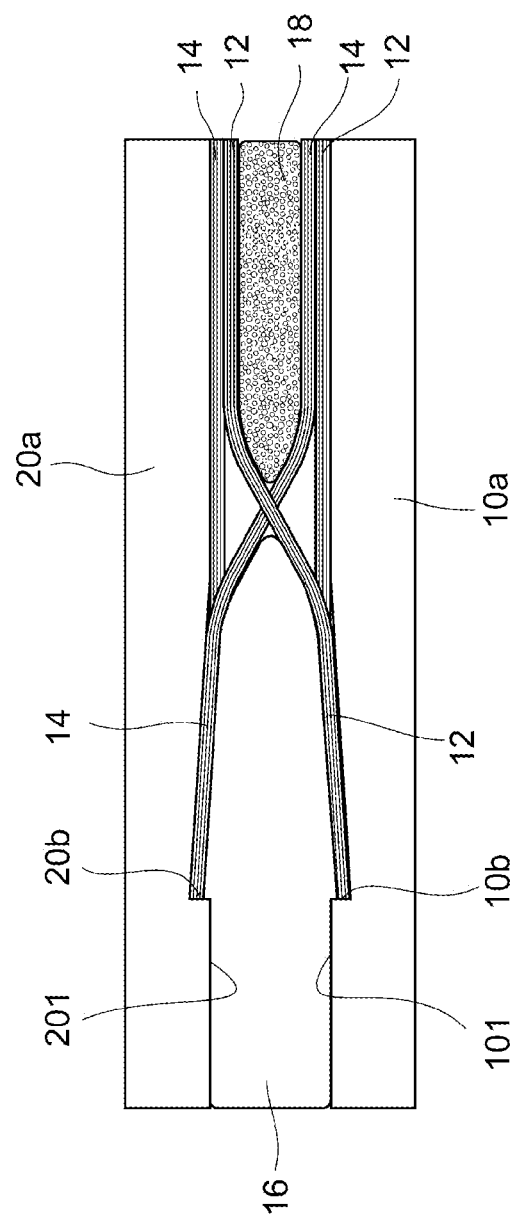
FIG. 8 is a side view for describing a modified example of the bonded structure that is the embodiment of this invention.

A modified example of this embodiment is illustrated in FIG. 8. As illustrated in FIG. 8, a recessed part 10b is formed in a part of the first region 101 of a first member 10a that is bonded to the first fiber part 12, and a recessed part 20b is formed in a part of the first region 201 of a second member 20a that is bonded to the second fiber part 14.

In this embodiment, leading the crack to a place between the first fiber part 12 and the second fiber part 14 enhances the reinforcement effect of the first fiber part 12 and the second fiber part 14. By forming the recessed parts 10b and 20b as described above and arranging end portions of the first fiber part 12 and the second fiber part 14 therein, the crack can be prevented from entering between the first fiber part 12 and the first member 10a and between the second fiber part 14 and the second member 20a and the crack can be reliably led to a place between the first fiber part 12 and the second fiber part 14.

Figure 9:
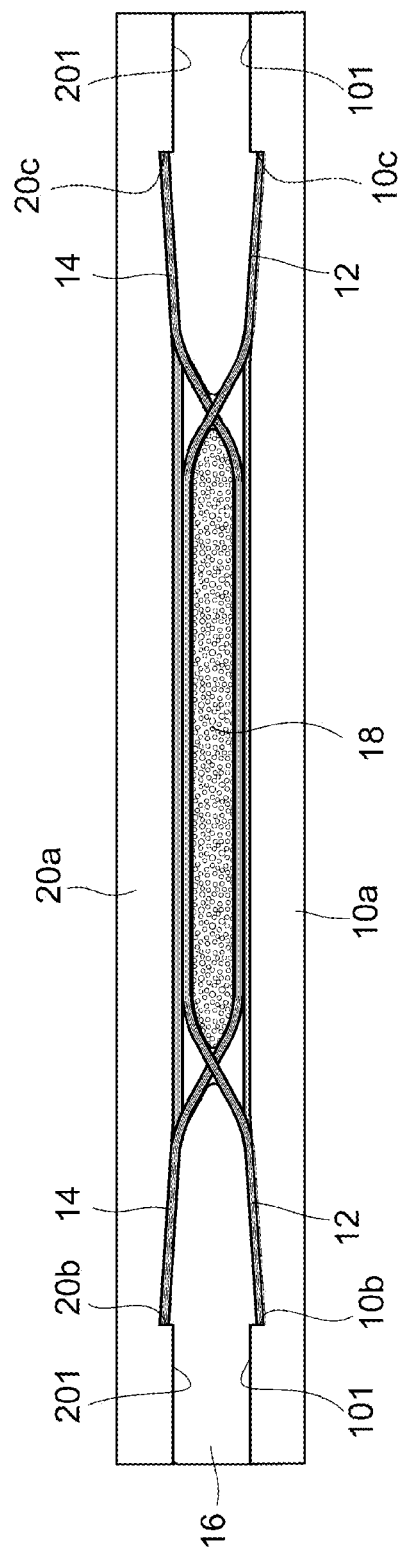
FIG. 9 is a side view for describing a modified example of the bonded structure that is the embodiment of this invention.

As illustrated in FIG. 9, an aspect that is a symmetrical form of the modified example illustrated in FIG. 8 is also a preferred modified example. In this aspect, recessed parts 10c and 20c are formed on the opposite side of the recessed parts 10b and 20b with respect to the reinforcement part 18 interposed therebetween, and parts at which the first fiber part 12 and the second fiber part 14 cross each other are formed with the reinforcement part 18 interposed therebetween. In the modified example illustrated in FIG. 9, the effect of preventing the crack growth described above can be exerted for the growth of the crack from the end portions in which the recessed parts 10b and 20b are formed and for the growth of the crack from the end portions in which the recessed parts 10c and 20c are formed. The crack growth preventing effect in load modes other than an opening load mode can be exerted because mechanical restriction of the first fiber part 12 and the second fiber part 14 is enhanced. The modified example illustrated in FIG. 9 is described as a modified example of the structure illustrated in FIG. 8, but the embodiment described with reference to FIG. 1 to FIG. 7 can also be a symmetrical form.

Figure 10:
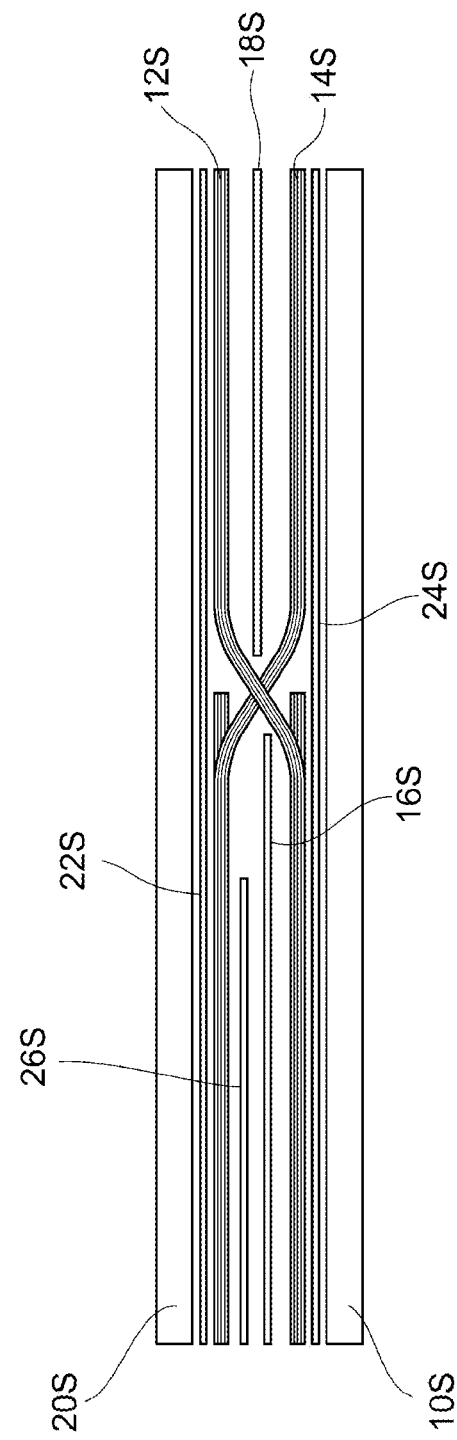
FIG. 10 is a view for describing an example for confirming the effect of this embodiment.

Now, an example for confirming the effect of this embodiment is described. FIG. 10 is a view illustrating an overview of a test piece according to the example. As illustrated in FIG. 10, the test piece includes adherends 10S and 20S, bonding films 16S, 22S, and 24S, and prepregs 12S, 14S, and 18S. The adherend 10S corresponds to the first member 10. The adherend 20S corresponds to the second member 20. The bonding film 16S corresponds to the bonding part 16. The prepreg 12S corresponds to the first fiber part 12. The prepreg 14S corresponds to the second fiber part 14. The prepreg 18S corresponds to the reinforcement part 18.

Figure 11:
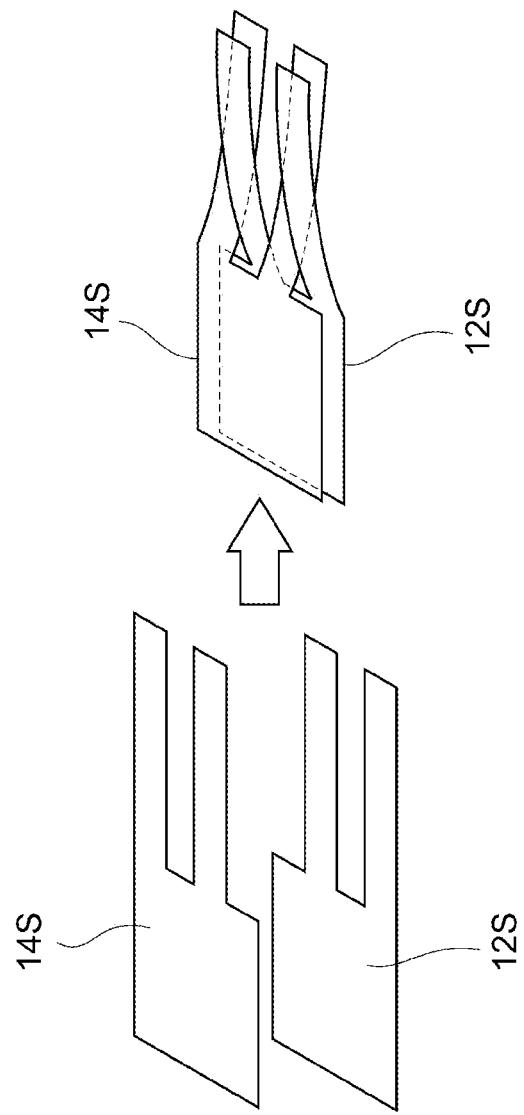
FIG. 11 is a view for describing this example.

A unidirectional material CFRP (T700S/2592, Toray Industries, Inc., $[0_{24}]$, thickness: 3.3 mm, width: 25 mm) is used as the material of the adherends 10S and 20S, and an AF163-2K (3M Company) is used as the material of the bonding films 16S, 22S, and 24S. The T700S/2592 that is the same as that in the adherend is used for the prepregs 12S, 14S, and 18S. The prepregs 12S and 14S forming a 0° layer is formed of two prepreg layers, and the prepreg 18S forming a 90° layer is formed of one prepreg layer. The upper and lower 0° layers have slits introduced in the fiber direction with a width of 5 mm to be engaged with each other, and the parts not crossing each other are cut off (see FIG. 11).

Figure 12:
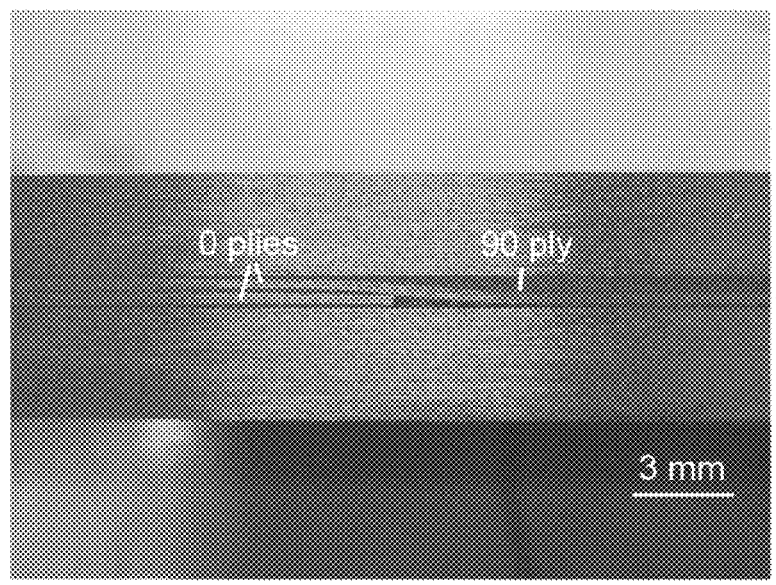
FIG. 12 is a view for describing this example.

First, the adherends 10S and 20S are cured and the bonding surfaces are sanded. Then, the bonding films 16S, 22S, and 24S and the prepregs 12S, 14S, and 18S serving as an arrester (crack growth prevention part) are integrated to be interposed between the adherends 10S and 20S and are cured. The cross section of the arrester after formation is illustrated in FIG. 12. The lower 0°-layer that is cut off in the middle, the upper 0°-layer meandering downward, and the 90°-layer adjacent thereto can be confirmed. There are the upper 0°-layer that is cut off and the lower 0°-layer meandering upward in a place 5 mm away from the cross section.

The test piece in which a hinge is bonded was mounted on a universal testing machine AG-50 kN (Shimadzu Corporation), to be thereby opened at a speed of 3 mm/min. An initial crack having a length of 50 mm was introduced in the test piece with use of a film 26S made of polytetrafluoroethylene (see FIG. 10). For comparison, a test piece having the same size in which an arrester is not introduced was manufactured and a similar test was performed.

Figure 13:
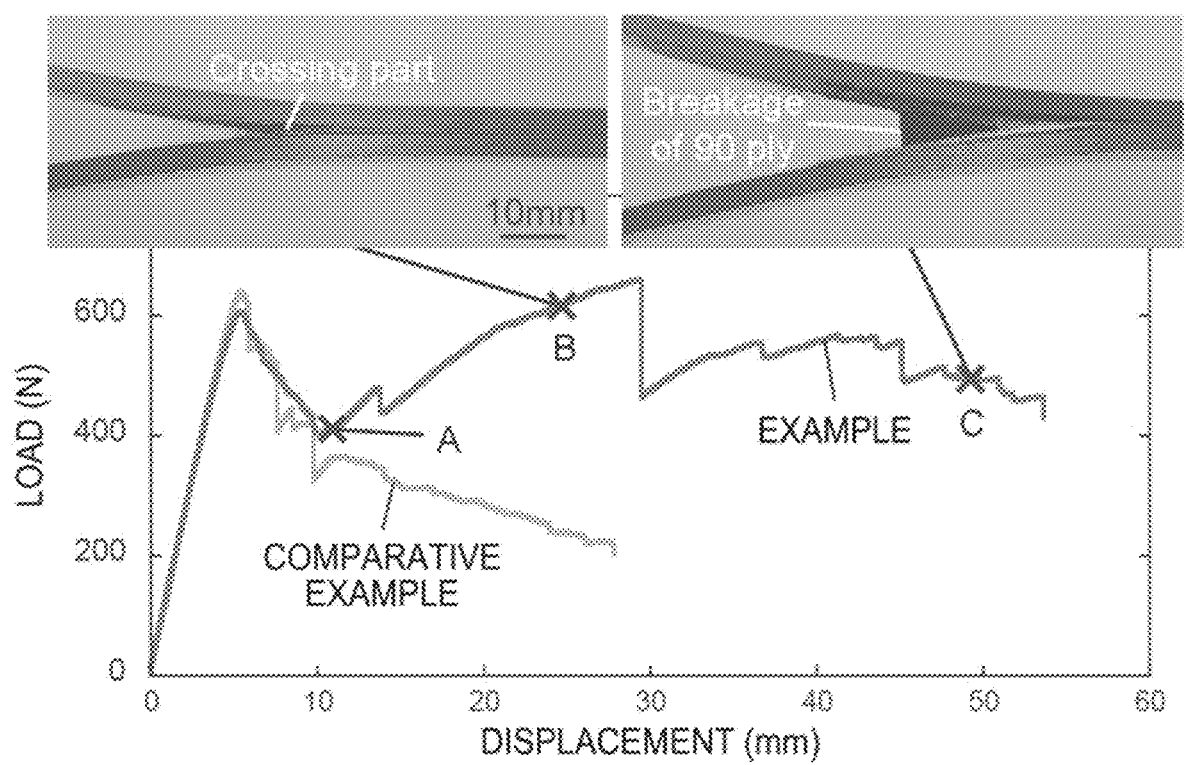
FIG. 13 is a view illustrating a result of a breaking test of the example illustrated in FIG. 10 to FIG. 12.

In FIG. 13, the obtained load-deformation curve and photographs of the test piece being applied with a load are illustrated. In the test piece without an arrester, a general behavior in which the load gradually decreases due to the growth of the crack after elastic deformation was obtained. In the test piece with an arrester, the load was inverted to be increased when the crack had stopped after reaching the arrester. Then, the load decreased with a breaking sound of the fibers, but the load required for the growth of the crack was at least twice as much as the case without the arrester for the same crack length. The opening displacement leading to the final breakage is about twice as much, and hence a great effect of preventing the crack growth as a whole was able to be confirmed.

Figure 14:
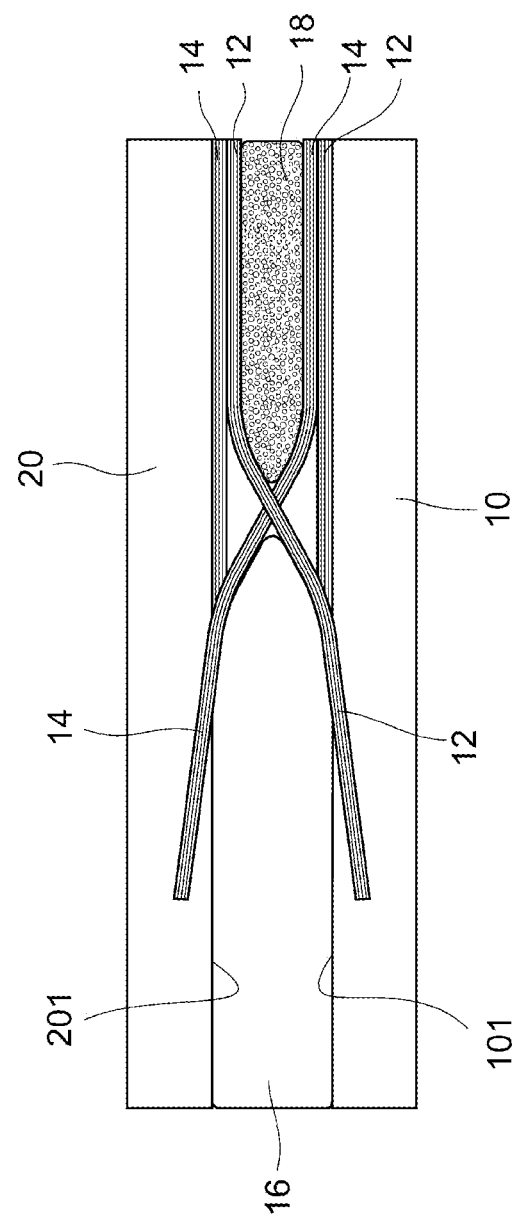
FIG. 14 is a side view for describing a modified example of the bonded structure that is the embodiment of this invention.

A modified example of this embodiment is illustrated in FIG. 14. FIG. 14 is a side view for describing a modified example of the bonded structure that is the embodiment of this invention. As illustrated in FIG. 14, in the first region 101 of the first member 10, the first fiber part 12 penetrates the first member 10. Similarly, in the first region 201 of the second member 20, the second fiber part 14 penetrates the second member 20. As a result, the crack entrapment and the weak bond resistance can be enhanced by forming a structure in which the first fiber part 12 and the second fiber part 14 penetrate the first member 10 and the second member 20.

Figure 15:
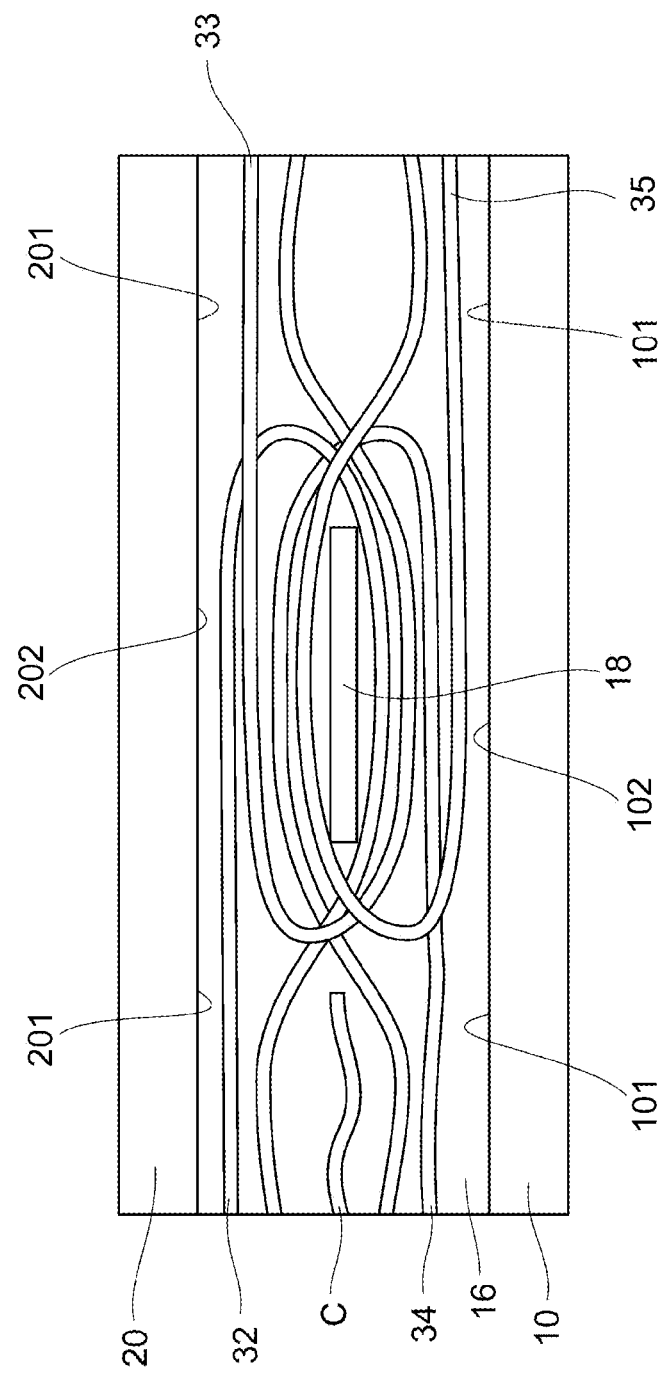
FIG. 15 is a side view for describing a modified example of the bonded structure that is the embodiment of this invention.
Figure 16:
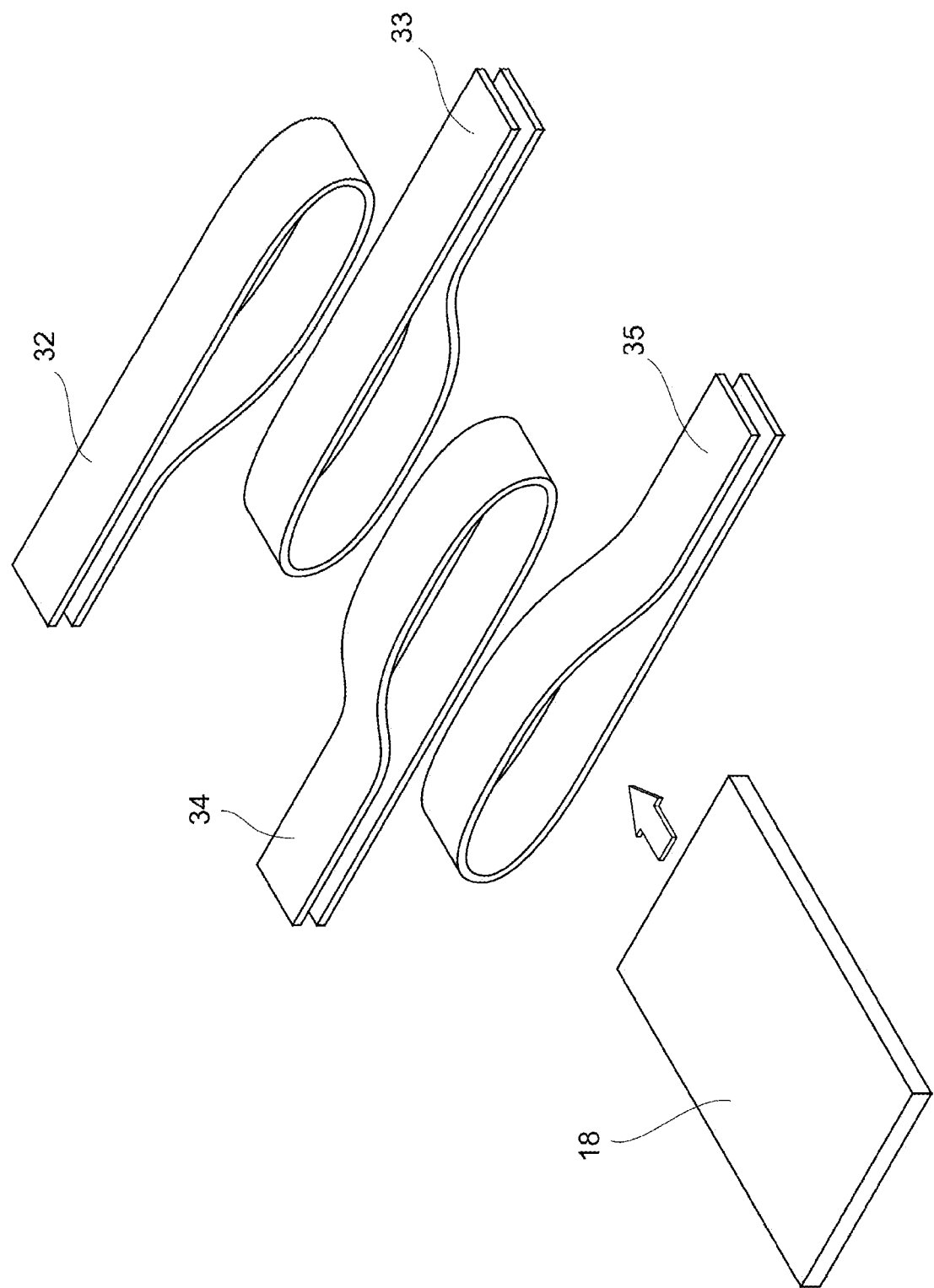
FIG. 16 is an exploded perspective view for describing the modified example illustrated in FIG. 15.

A modified example of this embodiment is illustrated in FIG. 15 and FIG. 16. FIG. 15 is a side view for describing a modified example of the bonded structure that is the embodiment of this invention. FIG. 16 is an exploded perspective view for describing the modified example illustrated in FIG. 15. As illustrated in FIG. 15 and FIG. 16, a first fiber part 34 is arranged so as to connect the first region 101 of the first member 10 and the second region 202 of the second member 20 to each other. More specifically, the first fiber part 34 is arranged from the first region 101 along the second region 102 of the first member 10 toward the second region 202 of the second member 20 so as to wind around the reinforcement part 18, to thereby be arranged along the first region 101 of the first member 10 again. Similarly, a first fiber part 35 is arranged so as to connect the first region 101 of the first member 10 and the second region 202 of the second member 20 to each other.

A second fiber part 32 is arranged so as to connect the first region 201 of the second member 20 and the second region 102 of the first member 10 to each other. More specifically, the second fiber part 32 is arranged from the first region 201 along the second region 202 of the second member 20 toward the second region 102 of the first member 10 so as to wind around the reinforcement part 18, to thereby be arranged along the first region 201 of the second member 20 again. Similarly, the second fiber part 33 is also arranged so as to connect the first region 201 of the second member 20 and the second region 102 of the first member 10 to each other.

Figure 17:
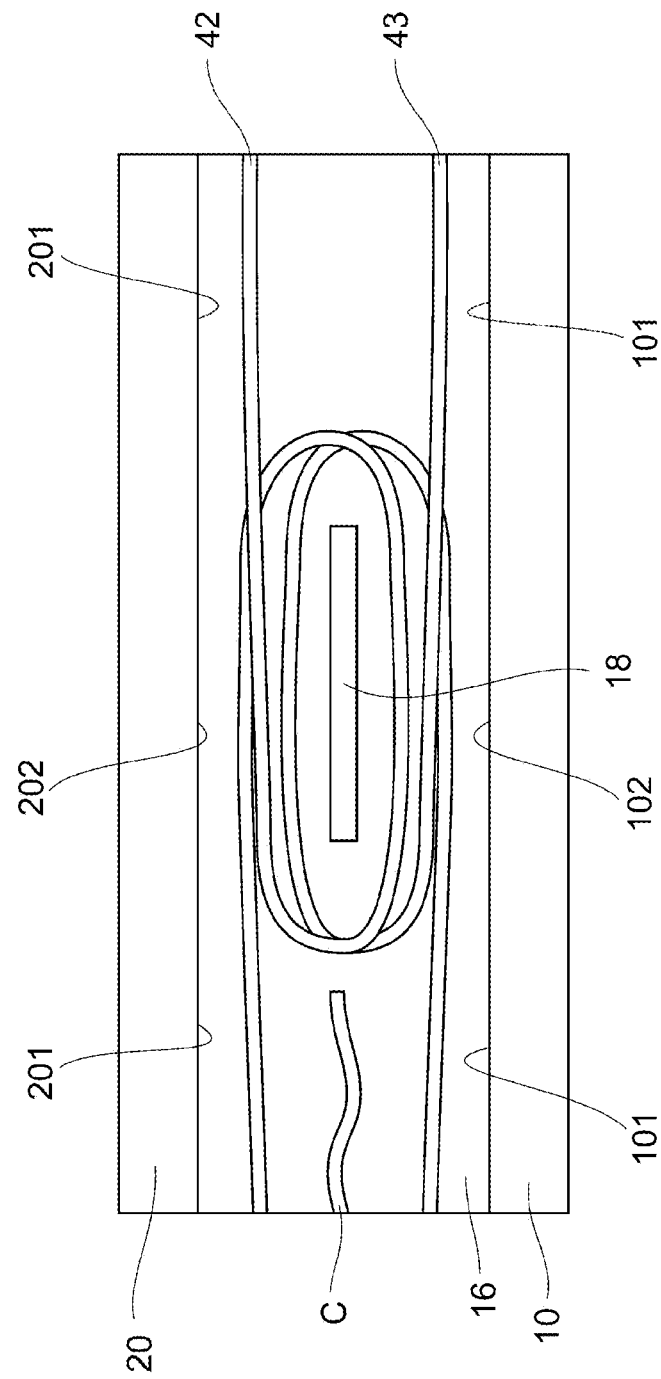
FIG. 17 a side view for describing a modified example of the bonded structure that is the embodiment of this invention.

FIG. 17 illustrates a modified example of this embodiment. FIG. 17 is a side view for describing a modified example of the bonded structure that is the embodiment of this invention. As illustrated in FIG. 17, a first fiber part 43 is arranged so as to connect the first region 101 of the first member 10 and the second region 202 of the second member 20 to each other. More specifically, the first fiber part 43 is arranged from the first region 101 along the second region 102 of the first member 10 toward the second region 202 of the second member 20 so as to wind around the reinforcement part 18, to thereby be arranged along the second region 102 of the first member 10 so as to form a loop by further winding around the reinforcement part 18. The first fiber part 43 is arranged from the first region 101 to the second region 102 of the first member 10 to reach the first region 101 on the opposite side while winding around the reinforcement part 18 once.

The second fiber part 42 is arranged so as to connect the first region 201 of the second member 20 and the second region 102 of the first member 10 to each other. More specifically, the second fiber part 42 is arranged from the first region 201 along the second region 202 of the second member 20 toward the second region 102 of the first member 10 so as to wind around the reinforcement part 18, to thereby be arranged along the second region 202 of the second member 20 to form a loop by further winding around the reinforcement part 18. The second fiber part 42 is arranged from the first region 201 to the second region 202 of the second member 20, to thereby reach the first region 201 on the opposite side while winding around the reinforcement part 18 once.

The arrangement of the first fiber parts 12, 34, 35, and 43 and the second fiber parts 14, 32, 33, and 42 and the arrangement of other members as specific examples of the crack growth prevention part according to this invention can be combined as appropriate. For example, the arrangement aspect of the first fiber part 12 and the second fiber part 14 exemplified in FIG. 1 to FIG. 14, and the arrangement aspect of the first fiber parts 34 and 35 and the second fiber parts 32 and 33 exemplified in FIG. 15 can be combined. Those arrangement aspects and the arrangement aspect of the first fiber part 43 and the second fiber part 42 exemplified in FIG. 17 can be also combined.

REFERENCE SIGNS LIST

10 First member
10*a* First member
10*b*, 20*b* Recessed part
12 First fiber part
14 Second fiber part
16 Bonding part
18 Reinforcement part
20 Second member
20*a* Second member
101 First region
102 Second region
103 Third region
121 Continuous region
122*a*, 122*b* Strip-shaped region
141 Continuous region
142*a*, 142*b* Strip-shaped region
201 First region
202 Second region
203 Third region

What is claimed is:

1. A bonded structure in which a first member and a second member are bonded together in an opposing state, the bonded structure comprising a crack growth prevention part arranged between the first member and the second member,
    wherein the first member has a first bonding surface and the second member has a second bonding surface,
    wherein the crack growth prevention part is provided so as to connect the first bonding surface and the second bonding surface to each other,
    wherein the crack growth prevention part includes fibers and is arranged so that the fibers are oriented in a direction from the first bonding surface toward the second bonding surface,
    wherein the crack growth prevention part includes a first fiber part and a second fiber part,
    wherein the first bonding surface and the second bonding surface each include a first region, a second region, and a third region provided between the first region and the second region,
    wherein the first fiber part is provided so as to connect the first region of the first bonding surface and the second region of the second bonding surface to each other,
    wherein the second fiber part is provided so as to connect the second region of the first bonding surface and the first region of the second bonding surface to each other,
    wherein the first fiber part and the second fiber part are arranged to cross each other when the third region is seen from between the first member and the second member,
    further comprising a reinforcement part and a bonding part arranged between the first member and the second member,
    wherein the first fiber part and the second fiber part each include a continuous region and a strip-shaped region,
    wherein the continuous region of the first fiber part is bonded to the first region of the first bonding surface, the continuous region of the second fiber part is bonded to the first region of the second bonding surface, and the bonding part is arranged between the continuous region of the first fiber part and the continuous region of the second fiber part, and
    wherein the strip-shaped region of the first fiber part and the strip-shaped region of the second fiber part are directly bonded together, slits are provided so that a plurality of strip-shaped regions are formed along a fiber orientation direction, the plurality of strip-shaped regions are alternately bonded to the second region of the first bonding surface and the second region of the second bonding surface, and the reinforcement part is arranged between the bonded strip-shaped regions.

2. The bonded structure according to claim 1, wherein the reinforcement part comprises fibers, and wherein fiber orientation directions of the first fiber part and the second fiber part cross a fiber orientation direction of the fibers of the reinforcement part.

3. The bonded structure according to claim 1, further comprising a reinforcement part arranged between the first member and the second member,
    wherein the first fiber part is disposed along the first region of the first bonding surface, disposed along the second region of the first bonding surface, wound around the reinforcement part and disposed along the second region of the second bonding surface, and
    wherein the second fiber part is disposed along the first region of the second bonding surface, disposed along the second region of the second bonding surface, wound around the reinforcement part, and disposed along the second region of the first bonding surface.

4. The bonded structure according to claim 1, wherein a recessed part is formed in a part in the first region of the first bonding surface to which the first fiber part is bonded, and a recessed part is formed in a part in the first region of the second bonding surface to which the second fiber part is bonded.

5. The bonded structure according to claim 1, wherein the first fiber part penetrates the first member in the first region of the first bonding surface, and the second fiber part penetrates the second member in the first region of the second bonding surface.

* * * * *